Feb. 18, 1958

W. A. COLLINS 2,823,522

EVAPORATOR CONSTRUCTED FROM EXTRUDED
SECTIONS AND METHOD THEREFOR

Filed Aug. 14, 1953

INVENTOR.
William A. Collins.
BY
Harness, Dickey & Pierce
ATTORNEYS.

Feb. 18, 1958
W. A. COLLINS
2,823,522
EVAPORATOR CONSTRUCTED FROM EXTRUDED
SECTIONS AND METHOD THEREFOR
Filed Aug. 14, 1953
2 Sheets-Sheet 2
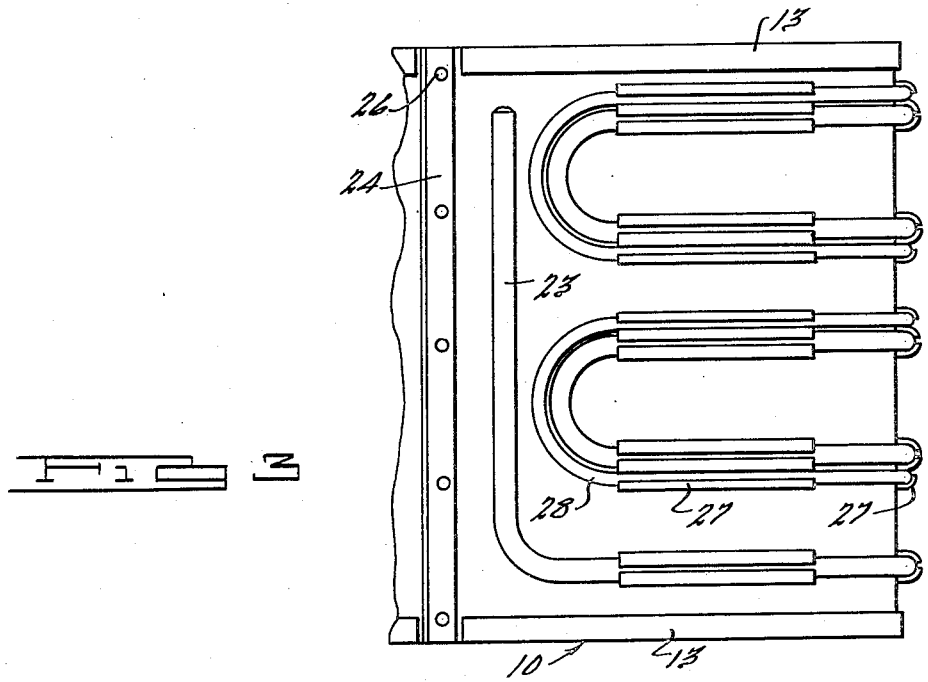
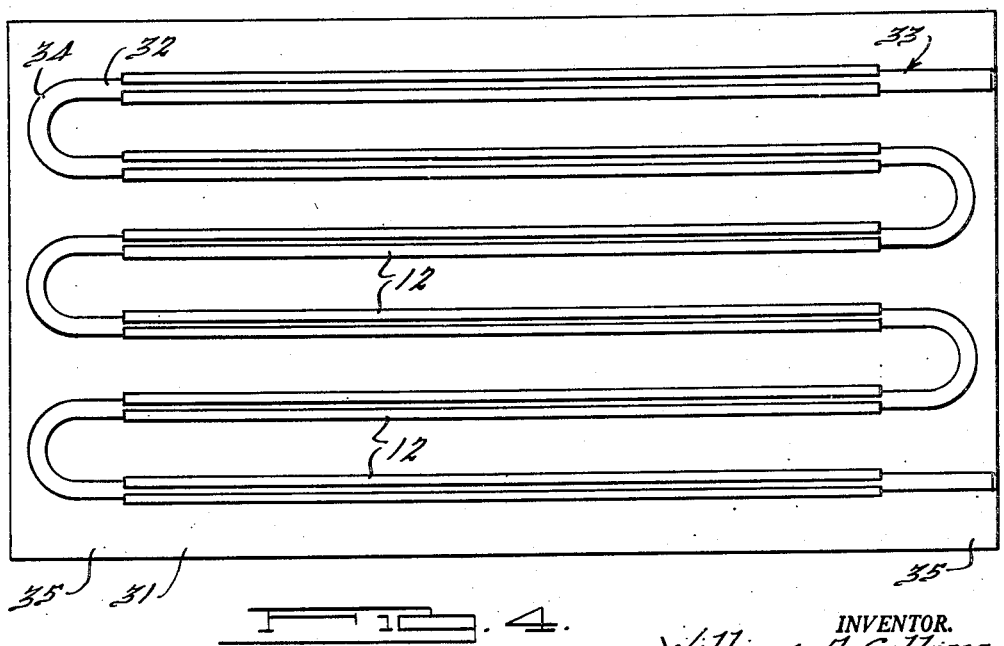
INVENTOR.
William A. Collins.
BY
Harness, Dickey & Pierce.
ATTORNEYS United States Patent Office 2,823,522
Patented Feb. 18, 1958

2,823,522

EVAPORATOR CONSTRUCTED FROM EXTRUDED SECTIONS AND METHOD THEREFOR

William A. Collins, Dowagiac, Mich., assignor to Rudy Manufacturing Company, Dowagiac, Mich., a corporation of Michigan Application August 14, 1953, Serial No. 374,365

5 Claims. (Cl. 62—126)

This invention relates to evaporators, and particularly to an evaporator employing an extruded plate which supports a continuous length of tube for the fluid conducting portion thereof.

The invention pertains to the use of an extruded plate having an outer surface provided with walls forming spaced channels throughout the length thereof. The walls are cut away at certain spaced points along the plate and a sinuously formed tube has the straight portions thereof disposed within the channels formed by pairs of the walls and retained therein in heat-transfer relation thereto by the clinching of the walls about said straight tube portions. Thereafter, the extruded plate is bent at the spaced points at which the walls were cut away, to form a closed construction with the ends abutted and welded, riveted, or otherwise secured together. The tube for conducting the fluid is continuous and disposed in intimate heat-conducting relationship with the extruded plate forming an evaporator, condenser or similar structure which is efficient in operation.

A third wall may be provided adjacent to the pairs of walls forming the channel, to form an additional channel in which a heating element may be retained closely adjacent to the sinuously formed tube when the third wall is clinched thereover. In a further arrangement, plate sections may be formed from the extruded plate having straight portions of a continuous length of tube secured thereto by clinching the pair of walls forming the spaced channel thereabout. Such plates may be employed for making evaporators of different capacity through the employment of different lengths of side walls attached to the ends of the plates for supporting them different distances apart.

Accordingly, the main object of the invention are: to form an evaporator from an extruded plate having pairs of walls forming spaced channels extending throughout the length thereof; to remove the walls of an extruded plate at spaced portions therealong and secure the straight portions of a sinuously formed tube within channels formed by pairs of the walls which are clinched thereover to be disposed on four sides of the evaporator when the plate is bent at the points where the walls were removed to form a closed construction; to provide an additional wall adjacent to the pairs of walls forming the spaced channels for securing a heating element adjacent to the sinuously formed tube by the clinching of the additional wall thereover; to form an evaporator from a pair of extruded plates having spaced channels thereon in which straight portions of a tube are secured by spacing said plates different distances apart by side walls of different lengths to vary the size of the evaporators, and, in general, to form an evaporator from an extruded plate having walls thereon which are clinched about straight portions of a sinuously formed tube which is simple in construction and economical of manufacture.

Other objects and features of novelty of the invention will be specifically pointed out or will become apparent when referring, for a better understanding of the invention, to the following description taken in conjunction with the accompanying drawings, wherein:

Fig. 3 is a broken view of structure, similar to that illustrated in Fig. 1, showing a modified form thereof, and Fig. 4 is a view of a plate to be employed in evaporators of different dimensions, which plate embodies features of the present invention.

Figure 1:
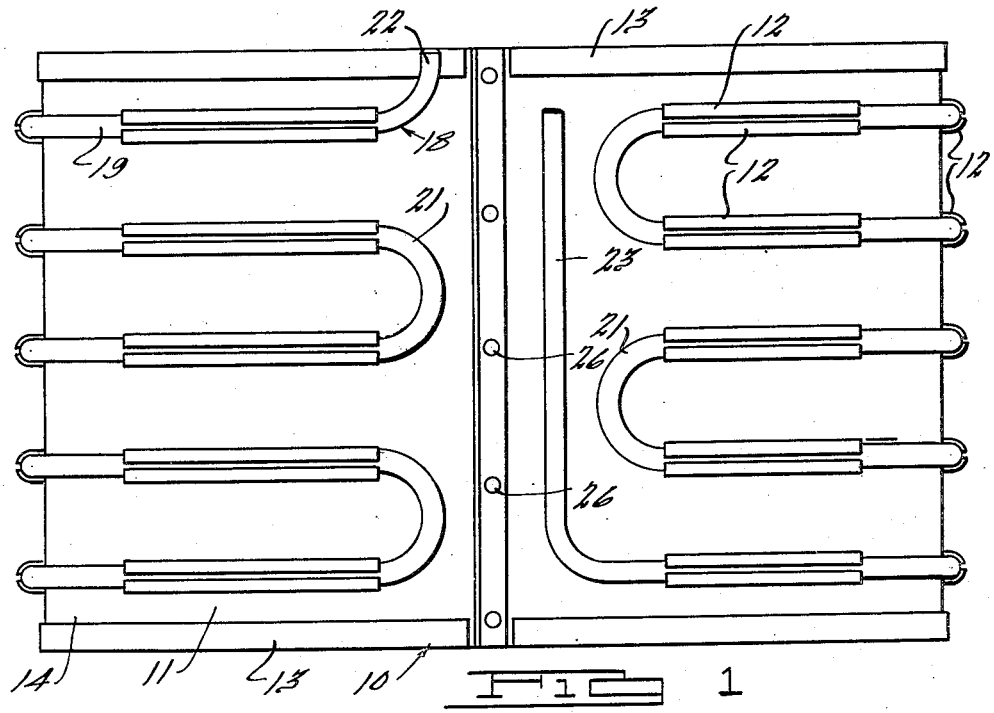
Figure 1 is a plan view of an evaporator embodying features of the present invention.
Figure 2:
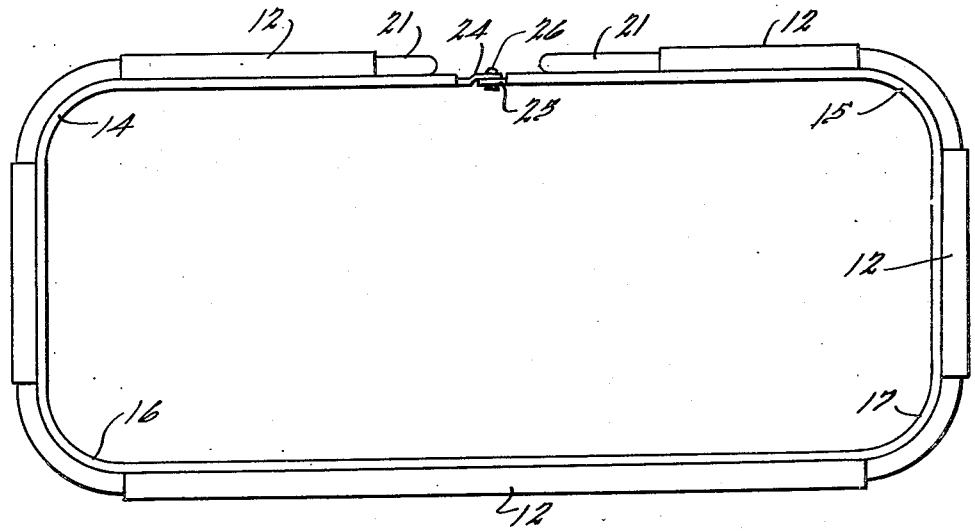
Fig. 2 is an end view of the evaporator of the structure illustrated in Fig. 1.

Referring to Figs. 1 and 2, an evaporator 10 is formed from an extruded plate 11 having pairs of continuous walls 12 which are spaced apart to provide a plurality of channels. The edges 13 of the plate may be thickened to provide strength thereto. Areas 14, 15, 16 and 17 have the extruded walls 12 cut therefrom so that the plate may be bent to form corners at the areas 14, 15, 16 and 17, as illustrated in Fig. 2. Before the bending occurs, a continuous length of tube 18 is bent into sinuous form having straight lengths 19 joined by end loops 21. The straight portions 19 are disposed between the pairs of walls 12 of the channels and are secured therein by the walls which are clinched thereabout, as illustrated in the figures.

The terminal ends 22 and 23 are bent in any desired manner and, as herein illustrated, are bent so as to have the ends thereof disposed near the rear open face of the evaporator. The adjacent ends 24 and 25 of the plate 11 are overlapped and secured together by rivets 26. It is to be understood that the ends may be abutted, overlapped, flanged or in any other manner disposed in intimate relation to each other and secured together by welding, brazing or any other means besides the specific rivets 26 herein illustrated. The tube 18 is disposed in intimate heat-conducting relationship with the plate 11 which may be made of aluminum, copper or any other extrudable metal which may be similar to the metal of the tube 18 or dissimilar thereto since the dissimilarity in expansion of the different metals will not impair the joints between the tube and plate.

In Fig. 3, a third wall 27 may be provided in parallel, spaced relation to the walls 12 for receiving and supporting the straight portions of a heating element 28 which is secured adjacent to the tube 18 throughout the major portion of the length thereof by the clinching-over of the wall portions 27. The heating element is employed to produce a rapid defrosting operation on the evaporator.

In Fig. 4, a further form of the inventive concept is illustrated, that wherein an extruded plate 31, having parallel walls 12 thereon with sections thereof cut from the ends of the pairs of the walls, receive straight portions 32 of a sinuously bent continuous length of tube 33, with the joined end loops 34 disposed at the end portions of the plate. The walls 12 are clinched over the straight portions 32 of the tube in the manner as referred to hereinabove, and the plates are employed in the construction of evaporators of different capacities by spacing the plates a greater or less distance apart through the use of end walls of different height. Such an arrangement was illustrated, described and claimed in the copending application of William A. Collins and Edward D. Floreen, Serial No. 337,762, filed February 19, 1953, and assigned to the assignee of the present invention.

It is to be understood that the plate arrangement as illustrated in Fig. 4 can be used separately as a condenser and as a condenser providing a chimney effect when the ends 35 are bent at right angles and secured against the rear face of a refrigerator. In such an arrangement, a plurality of such plates can be secured in the edge-to-edge relationship to provide length and increased capacity thereto.

What is claimed is:

1. In an evaporator, an extruded plate having spaced pairs of walls extending outwardly from one surface thereof in parallel relation to each other, said walls being interrupted at spaced points, and a sinuously formed tube having straight portions disposed between said spaced walls and secured therein by bent-over portions of the walls, the tube and plate forming at least a bottom and two side walls with corners therebetween provided at said interrupted points.

2. In an evaporator, an extruded plate having spaced pairs of walls extending outwardly from one surface thereof in parallel relation to each other, said walls being interrupted at spaced points, a sinuously formed tube having straight portions disposed between said spaced walls and secured therein by bent-over portions of the walls, the tube and plate forming at least a bottom, top and side walls with the ends of the plate in abutting relationship and corners therebetween provided at said interrupted points, and means securing said abutted ends to each other.

3. In an evaporator, an extruded plate having spaced pairs of walls extending outwardly from one surface thereof in parallel relation to each other, said walls being interrupted at spaced points, a sinuously formed tube having straight portions disposed between said spaced walls and secured therein by bent-over portions of the walls, the tube and plate forming at least a bottom, top and side walls with the ends of the plate in abutting relationship and corners therebetween provided at said interrupted points, means securing said abutted ends to each other, a third wall disposed in spaced relation to said spaced pairs of walls, and a heating element disposed in intimate relationship to said plate and tube secured by the clinched third wall.

4. In an evaporator, a plate having sections of three walls extending outwardly thereof in aligned spaced relation to each other, a formed tube having straight portions disposed between two of said walls, and a formed heating element having straight portions secured between the other of said three walls and an adjacent wall by bent-over portions thereof which secure the tube and heating element in intimate relation to each other and the plate, said plate being of the wrap-around type having corners between said sections.

5. The method of forming an evaporator which includes the steps: of extruding a plate to provide pairs of spaced walls disposed in spaced relation to each other, of removing sections of said walls at spaced points along the plate, of securing the straight portions of a sinuously formed tube within the pair of walls by clinching the walls thereover, and of thereafter bending the plate at the points at which the walls were removed to form the sides and bottom of the evaporator.

References Cited in the file of this patent

UNITED STATES PATENTS

| | | |
|---|---|---|
| 1,945,103 | Vis | Jan. 30, 1934 |
| 1,982,075 | Smith | Nov. 27, 1934 |
| 2,117,104 | Rorison | May 10, 1938 |
| 2,155,003 | Benson | Apr. 18, 1939 |
| 2,320,502 | Schullstrom | June 1, 1943 |
| 2,323,264 | Weiss | June 29, 1943 |
| 2,386,889 | Furry | Oct. 16, 1945 |
| 2,482,951 | Vonk | Sept. 27, 1949 |
| 2,687,626 | Bartlowe | Aug. 31, 1954 |